# 3,080,414
KETOCYCLOALIPHATIC NITRATES
John E. Franz, Crestwood, Mo., assignor to Monsanto Chemical Company, St. Louis, Mo., a corporation of Delaware
No Drawing. Filed Sept. 29, 1960, Ser. No. 59,189
11 Claims. (Cl. 260—466)

This invention relates to a new class of chemical compounds. More particularly, the invention relates to novel cycloaliphatic nitrates and to a method of preparing such compounds. Specifically, the invention relates to novel ketocycloaliphatic nitrates represented by the structural formula

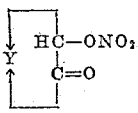

where Y is an alkylene or substituted alkylene radical having from 2 to 6 carbon atoms. The alkylene radical can have one or more carboxy, alkyl, phenyl, alkylated phenyl, napthyl, phenalkyl or halogen substituents. It will be apparent that Y can also be defined as the residue of a cycloaliphatic nucleus having 4 to 8 carbon atoms in the cyclic chain.

This invention is particularly concerned with a new class of compounds having utility as intermediates in organic synthesis, as in the preparation of polycarboxylic acids.

It is a primary object of this invention to provide novel ketocycloaliphatic nitrate compounds.

A further object of this invention is to provide a new and useful method for the preparation of such ketocycloaliphatic nitrates.

A still further object is to provide a novel class of ketocycloaliphatic nitrates which serve as intermediates in the preparation of polycarboxylic acids.

Other and different objects, features and advantages of this invention will become apparent to those skilled in the art upon consideration of the following detailed description thereof and the examples attendant thereto.

It has been found that ketocycloaliphatic nitrates of the general formula

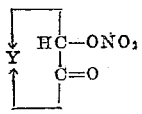

where Y has the same meaning as previously noted may be prepared by oxidizing, with nitrogen tetroxide and nitric acid, with or without a catalyst, an unsaturated cycloaliphatic compound of the general formula

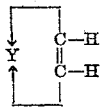

where Y has the same meaning as above. Illustrative of the cycloaliphatic compounds which may be oxidized by this process are cyclobutene; cyclopentene; cyclohexene; cycloheptene; cyclooctene; 3,4-dicarboxycyclobutene; 3-nonylcyclobutene; 4-octadecylcyclobutene; 4,5-dicarboxycyclohexene; 3-carboxycyclohexene; 4-carboxycyclohexene; 4-carboxy-4-methylcyclohexene; 5-carboxy-4-methylcyclohexene; cis-6-carboxy-5-methylcyclohexene; trans-6-carboxy-5-methylcyclohexene; 5-carboxy-3-methylcyclohexene; 6-carboxy-3-methylcyclohexene; 5-carboxy-4,6-dimethylcyclohexene; 3-methylcyclobutene; 3-ethylcyclobutene; 3-butylcyclobutene; 3-methylcyclopentene; 4-methylcyclopentene; 3-ethylcyclopentene; 3-iso-butylcyclopentene; 3-tert.-butylcyclohexene; 3-n-decylcyclopentene; 3-n-octadecylcyclopentene; 3-methylcyclohexene; 4-methylcyclohexene; 3-ethylcyclohexene; 3-n-propylcyclohexene; 3-iso-propylcyclohexene; 3-n-butylcyclohexene; 4-tert.-butylcyclohexene; 3,5-dimethylcyclohexene; 4,4-dimethylcyclohexene; 3,5,5-trimethylcycloheptene; 3-phenylcyclohexene; 4-phenylcyclohexene; 4-(p-tolyl) cyclohexene; 4-(2',6'-di-tert.-butylphenyl) cyclohexene; 3-naphthylcyclohexene; 3-benzylcyclohexene; 3-(2'-phenethyl) cyclohexene; 3-bromocyclobutene; 3,4-dichlorocyclobutene; 3,4-dibromocyclobutene; 3-chlorocyclopentene; 3,5-dibromocyclopentene; 3,4,5-tribromocyclopentene; 3-chlorocyclohexene; 3-bromocyclohexene; 3-iodocyclohexene; 4,5-dibromocyclohexene; 6-chloro-4-methylcyclohexene and the like.

In general, the nitric acid employed in this process can have a concentration range of from about 40 to about 100%. Preferably nitric acid concentrations in the range of from about 50 to about 70% are used.

The molar ratio of nitrogen tetroxide to the starting cycloaliphatic compound can vary from as low as 0.25:1 to as high as 1:1. A mol ratio of nitrogen tetroxide to oxidized compound in the range of from about 0.6:1 to about 0.9:1 is preferred.

The temperature required for the reaction can be varied from —25 to 25° C. However, a temperature range of 0 to 8° C. is preferable.

The oxidation step may be carried out in the absence of a catalyst. However, it is found to be advantageous to use a catalyst to obtain improved yields and increase the oxidation rate. Any vanadium compound which is soluble in the oxidation mixture can be employed as a catalyst in the practice of this invention.

Illustrative of the vanadium compounds which can be used as catalysts in this invention are the ammonium and alkali metal vanadates, vanadium oxides, vanadium sulfates and vanadium halides such as bromides, chlorides, iodides and fluorides.

Generally at least about 0.01 gram of catalyst, and preferably from about 0.1 gram to about one gram, per mol of cycloaliphatic compound is sufficient for the practice of this invention.

The invention will be more fully understood by reference to the following examples which describe the detailed preparation of representative compounds. There are, of course, many other forms of this invention which will become obvious to one skilled in the art once the invention has been fully disclosed, and it will accordingly be understood that these examples are given for the purpose of illustration only, and are not to be contrued as limiting the scope of this invention in any way.

Example I

A 200 ml. three neck round bottom flask equipped with condenser, stirrer, and thermometer, is charged with 100 ml. of 70 percent nitric acid and cooled to 0–8° C. 30 grams of nitrogen tetroxide and 33 grams of cyclohexene are added simultaneously over a four hour period at such a rate as to maintain the reaction temperature at 0–8° C. The resulting yellow solution is stirred for one hour at 0° C. The solution is then diluted with 150 ml. of water and stirred an additional 16 hours at 25° C. The oil which separates is extracted with ether. The extracted oil is washed with water and dried in a vacuum to give crystals of 2-ketocyclohexyl nitrate.

Example II

A suitable reactor is charged with 100 ml. of 70 percent nitric acid and 0.2 gram ammonium vanadate. This initial charge to the reactor is cooled to 0–8° C. 30 grams of nitrogen tetroxide and 33 grams of cyclohexene are then added simultaneously over a four hour period at such a rate as to maintain the reaction temperature at 0–8° C. The red-brown solution which results is stirred at 0° C. for one hour. This solution is then diluted with 150 ml. water and stirred an additional 16 hours at 25° C. The oil which separates is extracted with ether. The extracted oil is washed with water and dried in a vacuum. The resulting red oil deposits crystals upon cooling.

Crystallization from an alcohol-water mixture gives a product, 2-ketocyclohexyl nitrate, having a melting point of 31.5–32.5° C. and a B.P. of 61–5° C. at 0.2 mm.

*Example III*

A suitable reactor is charged with 100 ml. of 70 percent nitric acid and 0.2 gram ammonium vanadate and cooled to 0–8° C. 30 grams of nitrogen tetroxide and 54.3 grams of tetrahydroorthophthalic acid are then added simultaneously over a period of about four hours, at a rate to maintain a reaction temperature of 0–8° C. The resulting red-brown solution is stirred for one hour at 0° C. 150 ml. of water is added, and the solution is stirred an additional 16 hours at 25° C. The solid product is recovered by filtration. 2-keto 4,5-dicarboxycyclohexyl nitrate, recrystallized from ethyl acetate, has a M.P. of 149–150° C.

*Example IV*

A suitable reactor is charged with 100 ml. of 70 percent nitric acid and 0.2 gram of ammonium vanadate. This initial charge to the reactor is cooled to 0–8° C. 30 grams of nitrogen tetroxide and 21.8 grams of cyclopentene are added simultaneously over a four hour period at such a rate as to maintain the reaction temperatures at 0–8° C. The solution is stirred one hour at 0° C. after addition of the reactants is completed. The oil which separates is extracted with ether. The extracted oil is washed with water and dried in a vacuum. An excellent yield of 2-ketocyclopentyl nitrate is obtained.

The organic nitrates of the present invention can be readily converted to additional valuable products. The ketocycloaliphatic nitrates have been found to be readily oxidized to polybasic acids in high yields. An improved process is thus provided for the production of such polybasic acids, namely, converting the unsaturated cycloaliphatics to ketocycloaliphatic nitrates and oxidizing the latter to the polybasic acids. In the case of cyclohexene, for example, the 2-ketocyclohexyl nitrate prepared in Example I can be oxidized to adipic acid.

The more detailed preparation of such polycarboxylic acids from ketocycloaliphatic nitrate compounds is illustrated by the following examples.

*Example V*

A 100 ml. three neck round bottom flask equipped with condenser, stirrer and thermometer is charged with 30 ml. of 70 percent nitric acid and 0.05 gram ammonium vanadate and heated to a temperature of about 60° C. 16.5 grams of 2-ketocyclohexyl nitrate are added to the reactor at a rate to maintain a reaction temperature of 60° C. After all of the nitrate has been added, the batch is stirred for an additional hour and a half at 60° C. and cooled to 5° C. A yield of 11 grams (90% of theory) of adipic acid is obtained.

*Example VI*

A suitable reactor is charged with 30 ml. of 70 percent nitric acid and 0.05 gram ammonium vanadate and heated to a temperature of about 60° C. 24.5 grams of 2-keto 4,5-dicarboxycyclohexyl nitrate are added at a rate to maintain the reaction temperature at 60° C. After all of the nitrate has been added, the batch is stirred an additional hour and a half at 60° C. and cooled to 5° C. Butane 1,2,3,4-tetracarboxylic acid crystallizes in a high yield.

*Example VII*

A suitable reactor is charged with 30 ml. of 70 percent nitric acid and 0.05 gram ammonium vanadate and heated to a temperature of about 60° C. 14.5 grams of 2-ketocyclopentyl nitrate are added to the reactor at a rate to maintain a reaction temperature of 60° C. After all of the nitrate has been added, the batch is stirred an additional one and a half hours at 60° C., cooled to 5° C. and evaporated to a small volume. Glutaric acid is crystallized out in an excellent yield.

As will be apparent to those skilled in the art, by proper choice of the ketocycloaliphatic nitrate, it is possible to produce a wide variety of aliphatic carboxylic acids.

While this invention has been described with respect to certain embodiments, it is not so limited, and it should be understood that variations and modifications thereof may be made which are obvious to those skilled in the art without departing from the spirit or scope in this invention.

The embodiments of the invention in which an exclusive property or privilege is claimed are defined as follows:

1. A ketocycloaliphatic nitrate of the structural formula

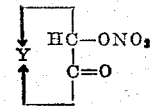

where Y is an alkylene radical having from 2 to 6 carbon atoms.

2. 2-ketocyclohexyl nitrate.
3. 2-ketocyclopentyl nitrate.
4. 2-keto 4,5-dicarboxycyclohexyl nitrate.
5. A ketocycloaliphatic nitrate of the structural formula

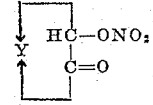

where Y is selected from the group consisting of alkylene and substituted alkylene radicals having from 2 to 6 carbon atoms, the substituent groups of the substituted alkylene radicals being selected from the group consisting of carboxy, alkyl, phenyl, alkylated phenyl, naphthyl, phenalkyl and halogen.

6. A method of preparing ketocycloaliphatic nitrates of the structural formula

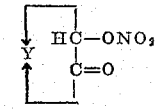

where Y is selected from the group consisting of alkylene and substituted alkylene radicals having from 2 to 6 carbon atoms, the substituent groups of the substituted alkylene radicals being selected from the group consisting of carboxy, alkyl, phenyl, alkylated phenyl, naphthyl, phenalkyl and halogen, which comprises oxidizing an unsaturated cycloaliphatic compound of the structural formula

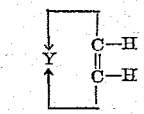

where Y has the same meaning as above, with nitrogen tetroxide and nitric acid.

7. A method as defined in claim 6 wherein the oxidation is carried out at a temperature of from about −25° C. to about 25° C.

8. A method as defined in claim 6 wherein the oxidation is carried out in the presence of a vanadium catalyst.

9. A method of preparing 2-ketocyclohexyl nitrate which comprises oxidizing cyclohexene with nitrogen tetroxide and nitric acid.

10. A method of preparing 2-ketocyclopentyl nitrate which comprises oxidizing cyclopentene with nitrogen tetroxide and nitric acid.

11. A method of preparing 2-keto 4,5-dicarboxycyclohexyl nitrate which comprises oxidizing tetrahydroorthophthalic acid with nitrogen tetroxide and nitric acid.

References Cited in the file of this patent
UNITED STATES PATENTS 2,698,228     Kincaid et al. _____ Dec. 28, 1954